United States Patent [19]

Fischer

[11] 4,362,390

[45] Dec. 7, 1982

[54] DRIVE ASSEMBLY FOR VEHICULAR CEMENT MIXERS

[75] Inventor: Manfred Fischer, Friedrichshafen, Fed. Rep. of Germany

[73] Assignee: Zahnradfabrik Friedrichshafen, Aktiengesellschaft, Friedrichshafen, Fed. Rep. of Germany

[21] Appl. No.: 175,921

[22] Filed: Aug. 6, 1980

[30] Foreign Application Priority Data

Aug. 7, 1979 [DE] Fed. Rep. of Germany ....... 2931969

[51] Int. Cl.³ .............................................. B28C 5/20
[52] U.S. Cl. ........................................ 366/61; 60/456
[58] Field of Search ...................... 366/60, 61, 62, 63; 60/456

[56] References Cited

U.S. PATENT DOCUMENTS

| 2,676,003 | 4/1954 | Oury | 366/61 |
| 2,968,915 | 1/1961 | Feistel, Jr. | 36/61 X |
| 3,658,303 | 4/1972 | Funk | 366/61 |

FOREIGN PATENT DOCUMENTS

| 2139492 | 5/1973 | Fed. Rep. of Germany | 366/61 |
| 839025 | 6/1960 | United Kingdom | 366/61 |

Primary Examiner—Philip R. Cue
Assistant Examiner—Joseph M. Pitko
Attorney, Agent, or Firm—Karl F. Ross

[57] ABSTRACT

The drive for rotating the drum of a vehicular cement mixer includes a mechanical power train mounted in a first chamber of a drive housing and a hydrostatic motor disposed in a second housing chamber substantially surrounded by yet another chamber defined in part by an outer wall of diecast aluminum formed on an outside surface with a plurality of outwardly extending fins and on an inside surface with a plurality of support plates connected to an inner housing well defining the inner chamber. The outer chamber communicates with the inner chamber by means of an overflow outlet at the top of the inner housing wall, oil escaping from the inner chamber via the outlet flowing down the support members to the inner surface of the outer housing wall. Heat from the oil is transferred through the outer housing wall and the fins to an airstream blowing past the same under the action of a blower driven by the hydrostatic motor, an air-flow guide extending from the blower to the fins for facilitating the motion of the air stream. The guide is provided with pivotable plates at the fins for facilitating the inspection and maintenance of the cooling surfaces. A hydraulic circuit connected to a sump at the bottom of the outer chamber energizes the hydrostatic motor and delivers oil to the first chamber for lubricating the mechanical train, the first chamber in turn communicating with the outer chamber for enabling the flow of oil from the first chamber to the sump.

13 Claims, 2 Drawing Figures

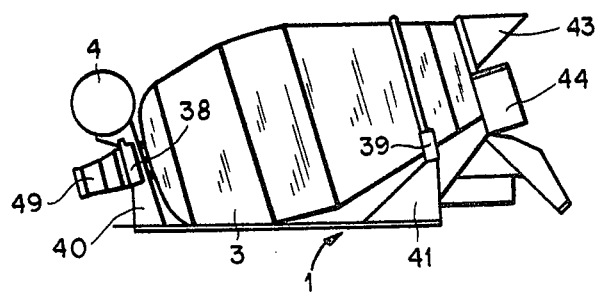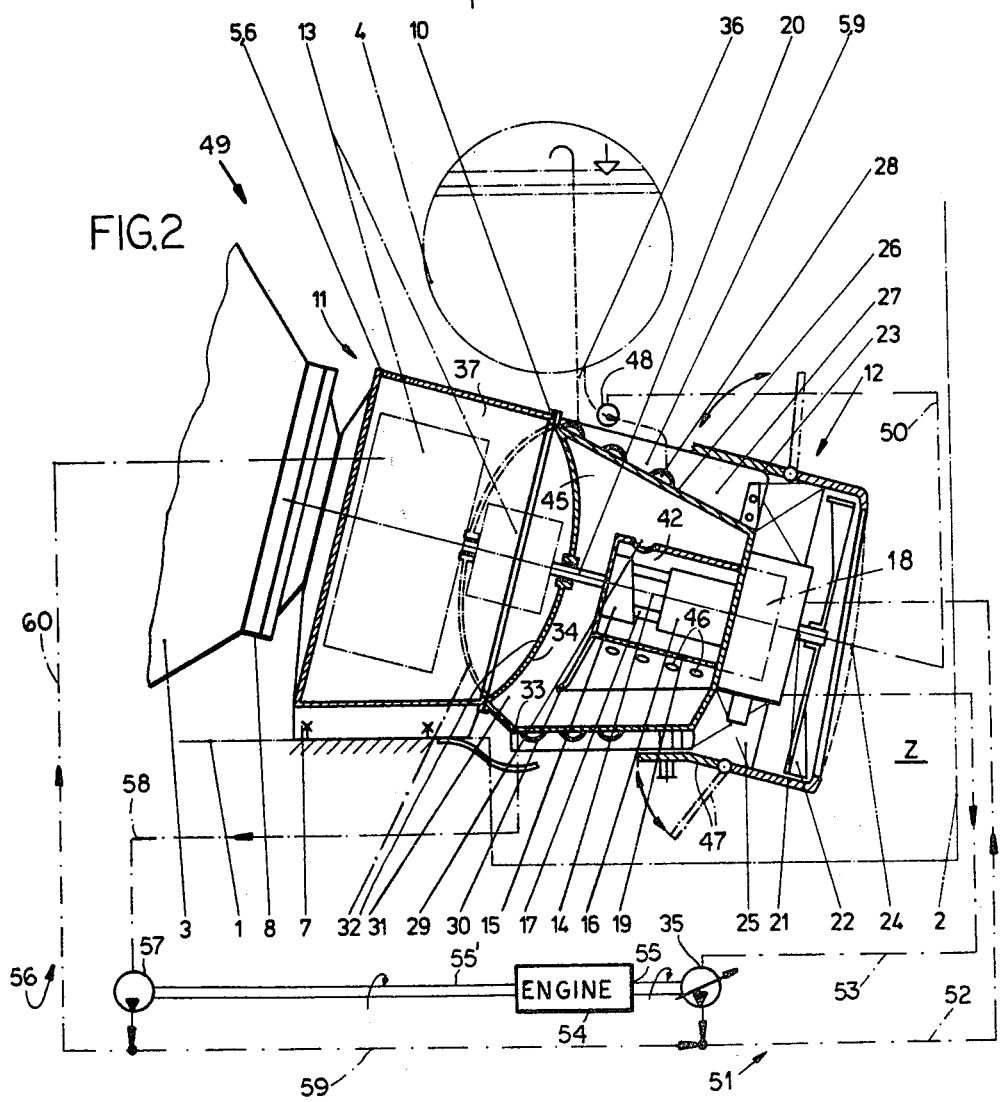

DRIVE ASSEMBLY FOR VEHICULAR CEMENT MIXERS

FIELD OF THE INVENTION

My present invention relates to vehicular cement mixers. More particularly, my present invention relates to an assembly for rotating the drum of such cement mixers.

BACKGROUND OF THE INVENTION

In vehicular cement mixers the mixing drum is rotated by a hydraulic drive generally energized by the vehicle's engine. The drive includes a hydrostatic motor connected via a torque-increasing power transmission to the drum, the cooling of the motor being effected by an oil bath. The oil is in turn cooled by means of a heat exchanger and an air blower generally driven by a separate power source such as an electric motor.

The oil from the motor-cooling bath may be circulated through the heat exchanger either by a pump or by a thermal siphoning effect. To increase the cooling performance the oil from the bath is partitioned into several streams which are channeled through respective thin-walled tubes or pockets of the heat exchanger. The air stream from the blower flows around the tubes and baffles of the heat exchanger and may be directed to subsequently blow on an outer surface of the drive housing.

Upon actual application of the above-described cooling system for relatively long periods of time, various difficulties arise. Dust and dirt frequently present in the air at construction sites form a coating on the heat exchangers which decreases the efficiency, i.e. the rate, of heat transfer and thereby creates oil feed and drive problems. Attempts to clean the heat exchangers frequently result in damage to the thin-walled circulation tubes.

Other disadvantages of cement mixers having such cooling systems include the relative inaccessibility of the cooling surfaces to inspection and maintenance and the impossibility of improving the cooling capacity without greatly raising energy expenditure. Generally the lubrication of the mechanical drive is separate from the cooling of the hydrostatic drive, different kinds of oil being required for the two functions. The separation of mechanical and hydrostatic oil-circulating systems more than doubles the difficulty of budgeting the oil supply.

OBJECTS OF THE INVENTION

An object of my present invention is to provide a vehicular cement mixer with an improved drive-cooling system in which the heat-transfer decrease due to dirt and dust coatings is reduced.

Another object of my present invention is to provide such a cement mixer in which cooling surfaces are more readily accessible to inspection and to cleaning operations.

Yet another object of my present invention is to provide such a cement mixer in which the cooling components are stronger and less prone to damage during cleaning.

Yet another object of my present invention is to provide such a mixer in which the energy used for cooling is minimized.

SUMMARY OF THE INVENTION

A cement mixer generally includes a cement-mixing drum rotatably mounted on a frame, a tap on the frame for extracting cement mixture from the drum and a loader on the frame for conveying raw materials into the drum. According to my present invention, a drive housing attached to the frame includes a first chamber having in an upper region an overflow outlet and a second chamber defined in part by an outer housing wall provided with a plurality of outwardly extending fins, the second chamber communicating with the first via the outlet and having a lower portion forming a sump. Fluid-circulating apparatus on the frame includes a hydraulic drive for energizing a hydrostatic motor disposed in the first chamber, the fluid-circulating apparatus being operatively connected to the second chamber for drawing cooled fluid from the sump and for utilizing the cooled fluid to drive the motor. A transmission in the housing is connected at an input end to the motor and at an output end to the drum, while a fan is operatively linked to the motor for blowing air past the cooling fins upon operation of the motor.

According to another feature of my present invention, the housing includes an additional chamber between the second chamber and the drum and the transmission includes a mechanical power train disposed in the additional chamber. The fluid-circulating apparatus includes a first hydraulic circuit extending to the additional chamber for transferring thereto fluid for lubricating the mechanical train and a second hydraulic circuit extending to the motor. The additional chamber communicates with the second chamber, whereby fluid flows from the additional chamber to the sump at the bottom of the second chamber.

According to another feature of my present invention, the second chamber contains a guide for channeling fluid from the first chamber to an inner surface of the outer housing wall. Preferably, the fluid guide comprises support members each connected at one end to the inner surface of the outer wall and at another end to an inner housing wall in part defining the first chamber. The support members extend at least partially downwardly from the overflow outlet to the inner surface of the outer housing wall and include perforations which serve in part to facilitate the upward passage of air and in part to facilitate the dropping of fluid to an underlying support member.

According to yet another feature of my present invention, the outer housing wall is formed with a fluid-flow conduit connected to a water-storage tank included in the loader. In the event of loading or tapping the cement-mixing drum, water may flow from the tank through the conduit to augment or supplement the cooling action of the fan and the fins.

According to further features of my present invention, an air guide is provided on the housing for forming an air-flow channel extending from the fan to the cooling fins, the air guide being mounted on the housing by a plurality of spaced brackets and including elements, e.g. plates, juxtaposed at least in part to the fins and shiftably secured to the housing for enabling inspection and maintenance of the cooling surfaces. Advantageously, the second chamber substantially surrounds the first chamber, while the outer housing wall and the fins are formed from die-cast aluminum.

Pursuant to another feature of my present invention, the housing includes an additional wall enclosing in part the mechanical-drive chamber, the outer housing wall being removably secured to this additional wall at a periphery of the housing. The additional chamber and the second chamber may be separated by an internal housing wall having in a lower region an aperture whereby the additional chamber communicates with the second chamber.

In a cement mixer having a cooling assembly according to my present invention, heat is transferred directly through the walls of the housing, especially at points with the highest temperatures. Cooling is accomplished with a minimum of energy expenditure, which enables a relatively great quantity of heat to be transferred during any interval. The efficiency of the heat removal is due in part to the duct or air guide extending from the fan to the cooling fins, this duct facilitating heat removal even during low rotation speeds of the fan.

Noise generated by the hydrostatic motor is damped or absorbed by the oil bath formed in the first or inner chamber owing to leakage from the motor.

It is advantageous that the lubricating fluid from the mechanical-drive chamber joins the fluid from the inner or first chamber only upon substantial cooling of this fluid in the second or outer chamber. The efficiency of the heat-transfer process is higher in this case than in a case where the two fluid streams are joined earlier.

BRIEF DESCRIPTION OF THE DRAWING

These and other features and advantages of my present invention will now be described in detail, reference being made to the accompanying drawing in which:

FIG. 1 is a partial side view of a vehicular cement mixer with a drive and cooling assembly according to my present invention; and FIG. 2 is a partially schematic and partially cross-sectional side view of the drive and cooling assembly of FIG. 1.

SPECIFIC DESCRIPTION

As shown in FIG. 1, a cement mixer, in particular a mixer mounted on a truck for mobility, includes a mixing drum 3 rotatably mounted by means of roller bearings 38, 39 on a pair of substantially upright supports 40, 41 forming parts of a frame 1 which may be integral with the vehicle frame. Attached to frame 1 are a feed hopper 43 for conveying raw materials, e.g. sand, lime, into drum 3 and a cement-tapping assembly 44 for extracting the mixture from the drum. A water-storage tank 4 is carried by support 40 and ensures a continual supply of water to drum 3 during transport by the truck vehicle.

As illustrated in FIG. 2, drum 3 is rotated by an assembly 49 including a hydraulic drive 12 connected via an output shaft 20 to a mechanical drive 11 in turn linked to drum 3 via a connecting flange 8. The mechanical drive may be in the form of one or more sets of planetary gears 13 disposed in a chamber 37 defined in part by an outer wall 6 and in part by an internal housing wall 32. Planetary gears serve to decrease the rotation speed of output shaft 20, thereby stepping up the torque applied to the mixing drum 3.

Chamber wall 6 forms a portion of a drive housing 5 which further comprises an inner wall 19 defining a first chamber 42 and an outer wall 26 in part defining a second chamber 45 substantially surrounding the first chamber. The outer wall 26 is separably attached to an annular flange 10 rigid with wall 6.

A hydrostatic motor 14 including an inclined plate 15, a rotor 16 and axially reciprocable pistons 17 is disposed in inner chamber 42, this chamber communicating with chamber 45 by means of an overflow outlet 29 formed in an upper region of the inner housing wall 19. Oil leaked from motor 14 during operation thereof is contained in the inner chamber and serves to cool the motor. Excess oil leaves chamber 42 as run-off at outlet 29.

Outer housing wall 26 is formed on an inside surface with a plurality of support plates 30 traversing outer chamber 45 and connected to inner housing wall 19 for supporting chamber 42, these plates extending downwardly from inner wall 19 to outer wall 26 and being provided with perforations 46 for facilitating the upward passage of air. The outer wall 26 is formed on an outside surface with a plurality of longitudinally or axially extending fins or ribs 27 and with a plurality of brackets or struts 25 which are rigid with a substantially cylindrical duct 23. This duct extends from a blower or fan 22 to fins 27 and has in the region of these fins pivotably mounted plates 47 for facilitating periodic inspection and maintenance of fins 27 and the outer surface of wall 26.

As described in commonly assigned copending U.S. patent application Ser. No. 116,978 filed Jan. 30, 1980, blower 22 may be drivingly connected to motor 14 by means of an auxiliary output shaft 21 which is an extension of shaft 20.

Housing wall 26 is further provided with one or more conduits 28 for the conveyance of a cooling liquid such as water. Water is circulated to the conduit via a hydraulic circuit 36 tied to storage tank 4 and including a pump 48 driven by an output shaft 21, as schematically illustrated by a dot-dash line 50. In the event of extended, relatively high-frequency rotation of drum 3 via drive 11, 12 or in case of elevated ambient temperatures, e.g. in the tropics, pump 48 may be activated to move water through conduit 28 and thereby supplement the cooling action of blower 22 and fins 27.

A fluid-circulating assembly for driving motor 14 includes a hydraulic circuit 51 with a high-pressure line 52 extending from a variable-displacement pump 35 to the stator 18 of motor 14 and a low-pressure line 53 connecting stator 18 to an inlet of pump 35, this pump being driven by the vehicle engine 54 via a power shaft 55. The fluid-circulating assembly includes a second hydraulic circuit 56 for removing cooled fluid from a sump 31 formed in a lower portion of outer chamber 45. A pump 57 is connected at an inlet to a conduit 58 extending from an opening 33 in a lowermost region of housing wall 26, pump 57 having a first output conduit 59 feeding high-pressure line 52 and a second output conduit 60 working into mechanical-drive chamber 37. Engine 54 energizes pump 57 via a shaft 55'.

Upon operation of a cement mixer by a drive assembly 49 according to my present invention, air is sucked from a space Z located between the drive assembly and a rear surface 2 of a truck cab (not shown) and is blown by fan 22 through an air-flow channel formed by duct 23. The air moves past brackets 25, cooling fins 27 and the outer surface of housing wall 26, thereby drawing heat from the housing components forming outer chamber 45. These components, in particular outer wall 26 and fins 27, are preferably made of die-cast aluminum to promote heat transfer and to provide sufficient structural strength while simultaneously inhibiting corrosion.

Hot pumping fluid (oil) spills from inner chamber 42 via outlet 29 and flows over support plates 30 to sump 31. Advantageously, plates 30 have an inclination angle causing the spilled oil to flow at least partially in the direction of blower 22, i.e. in a direction opposite to the air stream induced by the blower. This opposition of oil and air flow serves to increase the efficiency of heat transfer from the oil to the air via the metal housing.

Pumping fluid which has been cooled during motion along support plates 30 and during temporary storage in sump 31 is drawn therefrom by pump 57 and either restored to motor-energizing circuit 51 or delivered to mechanical-drive chamber 37 for lubricating planetary-gear train 13. As shown in FIG. 2, plate or wall 32 separating chambers 37 and 45 is provided in a lower region with an aperture 34, whereby lubricating fluid from chamber 37 enters sump 31 at the bottom of outer chamber 45. Thus, oil used for driving and cooling motor 14 is also used for lubricating mechanical drive 11.

Housing 5 is mounted on frame 1 by means of a bracket or a plurality of brackets 7. Bearing 38 (FIG. 1) may be located within mechanical-drive chamber 37 for being lubricated by oil conveyed by pump 57 and conduit 60.

Air-flow duct 23 is provided at an inflow end with a wire screen 24 for filtering from the air stream any dirt or other particles or objects which might adhere to the cooling surfaces 26 and 27 and thereby reduce heat transfer.

In a cement mixer having a cooling system according to my present invention the most important cooling surfaces, i.e. wall 26 and fins 27, are covered by a readily removable or shiftable cover in the form of pivotable plates 47. Wall 26 and fins 27 are sturdy elements able to withstand frequent spraying with high-pressure water for the removal of dirt layers blocking or inhibiting the efficient transfer of heat from the housing to the air stream from blower 22.

The combination of the fluidic circuits for lubricating the mechanical drive and for cooling the hydrostatic motor represents an improvement in the maintenance of an adequate oil supply. The lubricating oil from mechanical-drive chamber 37 may be combined with the hot oil from inner chamber 42 at a point higher than aperture 34, the resulting stream flowing down the spirally shaped ramps or support members 30 generally in a direction opposite the air stream from blower 22.

It is possible, particularly in cases of extreme temperatures, to spray the outside surface of housing wall 26 with water from tank 4, the evaporation of the water on the housing surface serving to absorb great quantities of heat. To this end tank 4 is advantageously provided with a nozzle (not shown) and a control valve (not shown).

I claim:

1. A cement mixer comprising:
a frame;
a cement-mixing drum rotatably mounted on said frame;
tapping means on said frame for extracting cement mixture from said drum;
loading means on said frame for conveying raw materials into said drum;
a drive housing attached to said frame and provided with a first chamber having in an upper region an overflow outlet, said housing having a second chamber defined in part by an outer housing wall provided with a plurality of outwardly extending cooling fins, said second chamber communicating with said first chamber via said outlet and including a lower portion forming a sump;
a hydrostatic motor disposed in said first chamber;
transmission means in said housing connected to said motor and to said drum for transmitting rotary power thereto from said motor;
fluid-circulating means including a hydraulic drive on said frame for energizing said motor, said fluid-circulating means being connected to said second chamber for drawing cooled fluid from said sump and utilizing the cooled fluid to drive said motor; and
fan means operatively connected to said motor and mounted on said housing for blowing air past said fins upon operation of said motor.

2. The mixer defined in claim 1 wherein said housing includes an additional chamber between said second chamber and said drum and said transmission means includes a mechanical power train disposed in said additional chamber, said fluid-circulating means including a first hydraulic circuit extending to said additional chamber for transferring thereto fluid for lubricating said train and a second hydraulic circuit extending to said motor, said additional chamber communicating with said second chamber, whereby fluid flows from said additional chamber to said sump.

3. The mixer defined in claim 2, further comprising fluid-guide means in said second chamber for channeling fluid from said first chamber to an inner surface of said housing wall.

4. The mixer defined in claim 3 wherein said fluid-guide means comprises support members each connected at one end to said inner surface and at another end to an inner housing wall in part defining said first chamber, said support members extending at least partially downwardly from said outlet to said inner surface and including perforations to facilitate an upward passage of air.

5. The mixer defined in claim 4 wherein said loading means includes a water-storage tank and said outer housing wall is formed with a conduit for the conveyance of cooling liquid, said conduit being connected to said tank.

6. The mixer defined in claim 2 wherein said housing includes an additional wall enclosing in part said additional chamber, said outer housing wall being removably attached to said additional wall at a periphery of said housing.

7. The mixer defined in claim 6 wherein said additional chamber and said second chamber are separated by an internal housing wall including in a lower region an aperture whereby said additional chamber communicates with said lower portion.

8. The mixer defined in claim 1, further comprising air-guide means on said housing for forming an air-flow channel extending from said fan means to said fins.

9. The mixer defined in claim 8 wherein said air-guide means includes guide members juxtaposed at least in part to said fins and shiftably secured to said housing for enabling inspection and maintenance of said fins.

10. The mixer defined in claim 9 wherein said air-guide means is mounted on said housing by means of a plurality of spaced brackets.

11. The mixer defined in claim 1 wherein said second chamber substantially surrounds said first chamber.

12. The mixer defined in claim 1 wherein said outer housing wall and said fins are made of aluminum.

13. The mixer defined in claim 12 wherein said outer outer housing wall and said fins are made of die-cast aluminum.

* * * * *